3,318,840
FOUNDRY COMPOSITION AND METHOD OF MAKING SAME

Bonheur M. Weston, deceased, late of St. Clair Shores, Mich., by George A. Cooney, executor, 17177 Parkside Ave., Detroit, Mich. 48221
No Drawing. Filed July 5, 1966, Ser. No. 564,502
5 Claims. (Cl. 260—41)

This is a continuation-in-part of my copending application Serial No. 173,819, filed February 16, 1962, now abandoned.

This invention relates broadly to refractory compositions for baked molds and cores and to novel methods and procedures for making the same; more particularly, the invention is concerned with means for binding the refractory sand particles together so as to obtain satisfactory green strength as well as baked strength without the use and presence in the binder of water or other undesirable constituents.

In conventional practice, refractory sand is mixed with binders, such as clays, cereals and flours which are activated by water to produce a cohesive composition that can be shaped or molded in a core box or against a pattern and which when removed from the box or pattern retains its shape until it can be hardened or made permanent by baking. The property of the composition which permits it to retain its shape during handling and treatment prior to baking is known in the trade as "green strength." However, water in the mix is a distinct detriment in the baking or curing operation and subsequently when metal is cast thereagainst as even small molds and cores require over 50% more time to bake or cure because of the water that must be removed by evaporation before baking or curing is complete. In somewhat larger molds and cores the baking required to remove all of the water is much longer, and it is impossible to remove the water completely from large bulk molds and cores within the practical limits of time in which the core or mold can be subjected to heat. Water which is not or cannot be removed by baking or curing is vaporized when molten metal is poured against the mold or core. This vapor escapes through the surface of the mold or core where it enters the still molten metal causing pin holes, porosity and "blows" which impair the appearance and usefulness of the casting.

In the invention covered by my U.S. Patent No. 2,444,413, issued July 6, 1948, I utilize a method of producing the necessary cohesive property or "green strength" in the production of baked molds and cores by replasticizing a non-thermal setting hydrocarbon resin affixed to the surface of the sand grains. This process although effective has two major drawbacks. It is expensive and it requires preparation of the sand before its use in making a composition for the production of cores or molds.

Several attempts have been made to reduce the cost of this method such as adding a dry powdered hydrocarbon resin (as described in my patent) to pre-heated sands as in Patent No. 2,491,006 or the replacement of the solvent used in my invention with a clay-water vehicle in which the powdered hydrocarbon resin was suspended as described in Patent No. 2,525,175. These techniques, however, failed to eliminate the necessity of two steps in the preparation of the sand for the production of cores or molds, or to provide a cohesive property without the use of clay or other gelatinous material and water.

Likewise many attempts have been made to utilize the binder employed to supply the baked or cured property to the mold or core as the solvent to plasticize the hydrocarbon resin designed to supply the cohesive or "green" property to the sand, but the amount necessary to render the hydrocarbon resin only cohesive and not to dissolve the hydrocarbon resin completely was insufficient to supply the necessary baked or cured strength required of such cores or molds, while the amount necessary to supply the required baked or cured strength was such that it either destroyed the cohesive property of the hydrocarbon resin or rendered the mixture so sticky that the molded or shaped sand could not be removed from the core box or pattern.

It might be pointed out here that the success of wet sand mixes now employed for the production of baked cores and molds and their ability to perform well in a core box or against a pattern, resides in the fact such compositions are what might best be described as two phase systems. In these systems, a gelatinous material is used in a prescribed amount necessary to provide the desired "green strength" and is activated with just the right amount of water to make it cohesive but not sticky. Then the prescribed amount of binder necessary to produce the baked or cured property required is added to the mix. Now for a good working sand mix it is essential that these two materials have as little as possible effect on each other; viz, the green property material should be in the aqueous phase and the baked or cured binder should be in the non-aqueous phase so that the desired property of the first is undisturbed by the second and predominates until the heat is applied and the second phase takes over.

According to this invention I have designed and perfected a two phase system wherein the "green strength" binder is in the non-aqueous or oily phase and the baked strength binder is in the alcohol phase which is a water soluble phase although devoid of any appreciable amount of water.

More particularly, the present invention comprises the steps of first dry mixing sand and a finely ground non-thermosetting hydrocarbon resin containing at least 15% of oily constituents, second wetting the mix with just enough solvent to cause the resin particles to adhere to the sand particles while leaving the same practically dry and free flowing and third mulling into the mix a baked strength resin that does not contain free alcohol, solvent or oily vehicle that would further plasticize or dissolve the hydrocarbon resin and adding additional solvent in an amount sufficient to render the resin coated sand particles cohesive.

I have found that if the dry admixture of sand and powdered hydrocarbon resin is plasticized to a point where the desired green strength is developed before the baked or cured strength resin is added, the subsequent coating of the sand grains by this resin reduces substantially the effectiveness of the cohesive property of the plasticized hydrocarbon resin. On the other hand, if the sand is first coated with the baked strength resin the hydrocarbon resin will not coat the sand grains and considerably more such hydrocarbon resins is required for a given green strength.

In general, the green strength hydrocarbon resin should be combustible in the range 600° F. to 800° F. approximately. It should be non-thermosetting and soluble or dispersible in non-aqueous inflammable solvents which may be driven off or evaporated readily at temperatures below 300° F., have an ignition point preferably above 100° F., and which does not chemically react with the resin or change its non-thermosetting character. It is preferable to use resins which have a relative high carbon and low hydrogen content in order to take up the oxygen present and to minimize the formation of water upon the composition during combustion. It is also desirable but not essential to catalyze the resin with metallic oxides (not less than one-half or one percent by weight of the resin) as such oxides appear to have the effect of inducing an earlier combustion of the carbon of the resin and of producing a non-oxidizing atmosphere at the surface of the casting. Oxides of silver, nickel, cerium, vanadium, manganese, chromium, copper, cobalt and iron are suitable. Also, as indicated above, the resin should contain a minimum of 15% oily constituents. The maximum amount of such oily constituents that the resin may contain is limited only by the fact that it must be susceptible to being ground into a fine non-caking powder.

Hydrocarbon resin produced in petroleum cracking is typical of the resin suitable for use in the instant process. A general specification of a typical resin known in the trade as "Vanadiset" is set forth in Table I below:

TABLE I

Chemical constituents

| | Percent |
|---|---|
| Carbon | 84.42 |
| Hydrogen | 8.53 |
| Oxygen | 1.86 |
| Nitrogen | 1.12 |
| Sulphur | 3.50 |
| Moisture | 14.00 |
| Mineral matter (substantially metallic oxide) | [1] 0.57 |

[1] Or less.

Hydrocarbon composition

| | Percent |
|---|---|
| Carbenes | 0.54 |
| Asphaltenes | 68.20 |
| Asphaltic resins | 5.60 |
| Petroleums | 29.74 |
| Solid paraffins | 0.64 |
| Saturated hydrocarbons | 21.24 |
| Sulfonation residue | 93.62 |
| Saponifiable matter | 0.31 |

Physical properties

| | |
|---|---|
| Color in the mass | Black. |
| Fracture | Conchoidal. |
| Streak on porcelain | Brown. |
| Acid number | 1. |
| Molecular weight | 3200 |
| Specific gravity at 77° F. | 1117. |
| Viscosity (NTP) | Solid. |
| Penetration: | |
| 77°/100/5 | 0. |
| 115°/100/5 | 1. |
| 135°/100/5 | 3. |
| 150°/100/5 | 8.5. |
| 185°/100/5 | 16.0. |
| Ductility at 185° | 2. |
| Susceptibility factor | 42.6. |
| Flash point, ° F. | 635 |
| Fusion point (R & B), ° F. | 300 to 350. |

The amount of hydrocarbon resin used may vary somewhat but it preferably is within the range of 1% to 5% by weight of the mix. From 1.5% to 3% by weight of hydrocarbon resin is sufficient and most practical for most purposes.

Any of a number of resins used and known in the trade as baked or cured strength binders may be used in the method of this invention. Phenol, urea, furfural and silicate resins and various natural and synthetic oil baking binders are typical examples of such binders. These resins are well known in the art and are conventionally used by the foundry industry for the purpose indicated; viz, they are incorporated in refractory compositions to render molds and cores made from the compositions essentially hard and strong. It is important, however, that these resins not contain free alcohol or any oily vehicle that would further plasticize or dissolve the hydrocarbon resin used to produce the "green" strength and thus destroy or impair the essential two phase mix. Also, the baked strength resin preferably should be fast curing. A typical resin baking binder of the phenol type is a one step phenol formaldehyde resin sold commercially by the Borden Chemical Company of Bainbridge, N.Y., under the trademark FB118 and having the following composition and characteristics:

| | |
|---|---|
| Resin solids | Approximately 63%. |
| Specific gravity | Approximately 1.207. |
| Water dilutability | Infinite when manufactured. |
| PH | Approximately 8.5. |
| Free formaldehyde | Less than 1%. |

Linseed oil is a typical natural oil baking binder suitable for use in mold and core compositions of this invention. Furfural resins used in conjunction with a catalyst are preferred as they provide good strength at reasonable cost and have the added advantage of being exothermic which guarantees a complete cure of the mold or core with a minimum of added heat. A typical cured strength binder of the furfural type is made by reacting furfural alcohol, formaldehyde and urea. In these compositions furfural alcohol comprises 50–90% of the starting materials, urea comprises 2–20%, and the balance is formaldehyde. The formaldehyde constituent frequently is charged as formalin but sometimes as paraform and the urea and formaldehyde constituents may be charged alternatively as the so-called "UF concentrates." In any event, these ingredients are reacted together to give a stable resin system having a viscosity of about 20–200 cps. at 20° C. After the reaction is completed, water of reaction and addition is removed to varying degrees. Commercial binders contain 1–20% water with 5–10% being probably the most typical. The reaction of the various monomers can be carried out either under acid or alkaline conditions. Also, after the reaction is complete, the pH normally is returned to a near neutral condition (pH 7–8) in order to provide maximum stability. In use, the resulting resin composition is reacidified usually with fairly large amounts of phosphoric acid which causes a thermosetting reaction to occur.

Various amounts of the baked strength resin also may be used in the method of this invention. Generally, this resin will comprise from 1% to 5% by weight of the mix and from 1½% to 3% is sufficient and practical for most purposes.

Any of a number of fast acting solvents can be used. Aromatic hydrocarbon solvents are preferred and those having substantially the following properties are suitable.

| | |
|---|---|
| Gravity A.P.I. | 20.0° to 40.0° Bé. |
| Specific gravity | 0.825 to 0.934. |
| Weight per gallon | 6.87 lb. to 7.78 lb. |
| Kauri butanol value at 77° F. | 60 to 80 cc. |
| Analine point (mixed) | 20° C. to 40° C. |
| Flash point (T.C.C.) | 100° F. to 200° F. |
| I.B.P. | 300° F. to 500° F. |
| E.B.P. | 375° F. to 600° F. |

The following specific solvents may be used:

| | |
|---|---|
| Turpentine | Toluol |
| Benzine | Xylol |
| Methyl methacrylate monomer | Phenol |
| Coal tar naphtha | Ethylene dichloride |
| Benzol | Carbon disulphide |

The amount of solvent used in the second step of the method of this invention may vary depending upon the amount of oily constituents present in the hydrocarbon resin; however, the amount of solvent generally will be within the range of 15% to 20% by weight of the hydrocarbon resin used. Similarly, the amount of solvent used in the last step of the invention may vary depending upon the amount of oily constituents contained in the baked strength resin. However, the solvent usually will be within the range of 20% to 25% by weight of the baked strength resin. The solvent used in the last step of the invention may or may not be the same solvent used in the second step. It is beneficial, however, if the final addition of solvent contains some heavier aromatic factions or oily constituents as these additives will not only plasticize the hydrocarbon resin but they also add deformation to the sand mix, improve the useful life of the mix by preventing evaporation, and provide a release agent against the inherent sticky property associated with most resins.

I have discovered that when powdered hydrocarbon resins of the type specified above are mixed in the proper amount with dry sand and then activated with a minimum of fast acting solvent, the resin adheres to the sand grains as discrete particles. Then, when an additional predetermined amount of solvent is added in the last step the resin becomes cohesive and causes the sand grains to cohere when pressed together thus eliminating the additional operation of drying the coated sand before use as described in my Patent No. 2,444,413.

The following is a typical refractory composition embodying the invention:

|  | Percent by weight |
|---|---|
| (1) Sand | 93 to 96 |
| (2) Powdered hydrocarbon resin (Vanadiset) | 1.5 to 3.0 |
| (3) Xylol (or xylene) | 0.5 to 1.0 |
| (4) Catalyst | 0.03 to 0.12 |
| (5) Furfural resin | 1.5 to 3.0 |

In the above composition, the catalyst preferably is a dry powder such as ammonium chloride. Items number 1, 2 and 4 should be dry mixed until completely blended. About 40% of item number 3 is added and the mix mulled until the sand shows by its uniform black color that it is coated. Item number 5 is then added and mulled in. The balance of item number 3 is then added and the mix mulled until the "green strength" is developed.

Having thus described the invention, I claim:

1. The method comprising: first dry mixing sand and 1%–5% by weight of a finely ground non-thermosetting hydrocarbon resin having at least 15% oily constituents, second mixing into the sand-resin composition just enough solvent to cause the resin particles to adhere to the sand particles while leaving the same practically dry and free flowing, third mulling into the sand-resin-solvent mixture 1%–5% by weight of a baked strength resin which is essentially free from alcohol, solvent or oily vehicle which would further plasticize or dissolve said hydrocarbon resin and fourth adding additional solvent in an amount sufficient to render the mixture cohesive.

2. The method described in claim 1 wherein the baked strength resin used is furfural resin and catalyst therefor.

3. The method described in claim 1 wherein the hydrocarbon resin is the resin described in Table I of the specification and the baked strength resin used is a furfural resin and catalyst therefor.

4. The method described in claim 1 wherein the amount of solvent used in the second step is from 15% to 20% by weight of the hydrocarbon resin used in the first step.

5. The method described in claim 1 wherein the amount of solvent used in the last step is from 20% to 25% by weight of the resins present in the mix.

No references cited.

MORRIS LIEBMAN, *Primary Examiner.*

A. KOECKERT, R. BARON, *Assistant Examiners.*